MAGNETIC DATA STORAGE DEVICE

Filed May 25, 1965

INVENTORS.
GEORGE H. GUTTROFF
DONALD K. HANSON
BY
H. W. Lasche
Paul S. Collignon
ATT'YS.

United States Patent Office 3,524,171

Patented Aug. 11, 1970

3,524,171

MAGNETIC DATA STORAGE DEVICE

George H. Guttroff, Norristown, and Donald K. Hanson, Center Square, Pa., assignors, by mesne assignments, to the United States of America as represented by the Secretary of the Navy Filed May 25, 1965, Ser. No. 458,797
Int. Cl. G11c *11/14*
U.S. Cl. 340—174 1 Claim

ABSTRACT OF THE DISCLOSURE

A magnetic data storage system having a plurality of first and second types of memory devices, said first type of memory device each having a plated-wire for storing data and each of the second type of memory device being comprised of an annular core having first and second windings of a transformer threaded therewith, with a different plated-wire from said first type of memory device serving as the secondary winding for each different transformer.

The present invention relates to a data storage device and more particularly to a data storage device that provides a permanent passive memory array capable of storing fixed information which requires no reset method of maintaining said information and provides information upon a "read" command. A further feature of this invention is directed to a unique combining of the above-noted permanent memory array with a conventional read and write memory array.

The present invention provides a simple and cheap permanent passive memory array that is compatible with other memory elements. A plated-wire memory, wherein new information can be recorded is combined with a permanent memory arrangement (for address purposes) that utilizes toroidal magnetic cores which assure that there will not be any information destruction in the event of a malfunction in the timing of bits or word signals, or if abnormally large currents flow in the circuits. The permanent bit information is provided by a plurality of linear toroidal cores (i.e. do not have a square B–H loop) which have a primary winding comprised of a drive line and a secondary winding comprised of a plated wire.

It is therefore a general object of the present invention to provide an improved magnetic storage device that occupies a relatively small amount of space.

Another object of the present invention is to provide a memory device wherein there will not be any loss of information in the event of a malfunction in a timing bit or in the event of an abnormally large current flow in the circuit.

Other objects and advantages of the present invention will be readily appreciated as the same becomes better understood by reference to the following detailed description when considered in connection with the accompanying drawing wherein.

Figures 1, 2, 3:
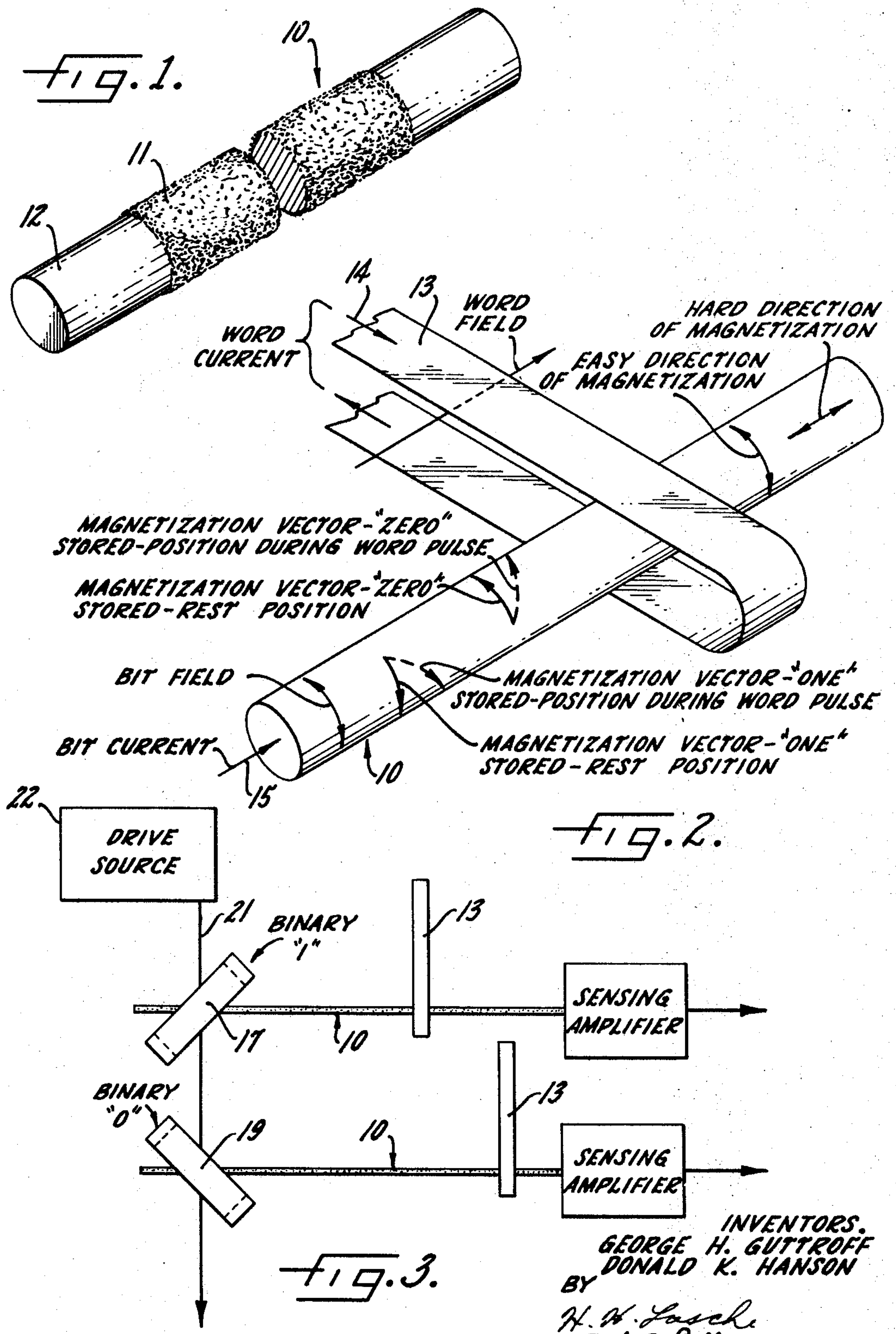
FIG. 1 is an enlarged perspective view showing a plated-wire memory device.
FIG. 2 is a diagrammatic view showing the operation of the memory device of FIG. 1.
FIG. 3 is a diagrammatic view showing a preferred embodiment of the present invention.

Referring to the drawing, there is shown in FIG. 1 an enlarged perspective view of a magnetic thin-film plated-wire memory element 10. By way of example, memory element 10 is comprised of a magnetic film 11 that is electroplated on a 5 mil diameter beryllium-copper wire 12, The magnetic film, by way of example, might be comprised of an alloy of 81 percent nickel and 19 percent iron. The magnetic film 11 is continuous and is placed in the presence of a circumferential magnetic field that establishes a magnetic anisotropy axis, or preferred magnetization direction, circumferentially around the memory element 10.

Referring now to FIG. 2 of the drawing, it can be seen that information is stored according to the sense of the circumferential magnetization in the portion of the plated-wire memory element 10 enveloped by the word strap 13. Clockwise magnetization represents a "one" stored and counterclockwise magnetization represents a "zero" stored. A word current is applied to the word strap 13 which envelops the plated-wire memory element 10 at right angles and produces a word field along the axis of memory element 10. This word field tilts the magnetization vector from its circumferential rest position towards the axis of memory element 10. The resulting flux and voltage changes at the ends of the memory element 10 are such that one output polarity occurs for a stored "one," and the opposite polarity occurs for a stored "zero." The word-current amplitude is controlled so that upon its release the magnetization vector returns to its original rest position and, therefore, the readout is nondestructive. Information is written into the plated-wire memory element 10 by the coincidence of the word current 14 and a steering bit current 15 which flows down the plated-wire memory element 10. When bit current 15 flows in one direction, the magnetization vector is so steered that upon release of the bit and word currents, the vector will be in the "one" rest position and, likewise, when the bit current flows in the opposite direction, the vector will be in the "zero" position.

Referring now to FIG. 3 of the drawing, which shows a preferred embodiment of the present invention, there is shown two linear annular core elements 17 and 19. Linear core elements utilized in accordance with this invention are known under the tradename Ferramic T–1. A drive line 21, which is connected to a drive source 22, is threaded through core elements 17 and 19 and drive line 21 serves as a primiary winding for the cores which function as 1:1 transformers. While two cores and two plated-wire memories are shown, it should be understood that these numbers of components are shown for purpose of illustration only, and that a lesser or greater number of components can be employed equally as well. A plated-wire memory element 10 is also passed through each core element and serves as secondary windings for the cores. A binary "one" and a binary zero" are distinguished by the threading arrangement between the drive lines and the cores. By way of example, core 17 represents a binary "one" and core 19 represents a binary "zero."

In operation, information is written into the conventional plated-wire memory 10 by the coincidence of word current 14 in strap 13 and the steering bit current 15 in plated-wire memory 10. Information is read from the conventional memory by simply energizing strap 13. The induced signal is thereby detected by the sensing amplifiers. By way of example, the normal current supplied to strap 13 for a write cycle might be about 800 milliamperes and the bit current 15 might be about 35 milliamperes. In order to read information from the permanent memory array, the drive source 22 provides approximately 35 milliamperes of drive current through the drive line 21 (i.e. the primary winding of the transformer) and the resultant induced current in the secondary winding (i.e. plated wire 10) is insufficient to disturb any information on the plated-wire memory 10 (i.e. along the wire containing the changeable information). The induced current in the transformer secondary of this invention is insufficient to disturb adjacent bit positions along the plated wire due to a poor co-efficient of coupling.

It can thus be seen that the present invention provides an improved data storage device wherein a passive memory array can be obtained by utilizing portions of a changeable memory array. This is accomplished by providing a transformer arrangement utilizing a linear core element in conjunction with a primary and secondary winding. The secondary of the transformer comprises a plated-wire memory element which can have its information altered when utilized in conjunction with a strap.

What is claimed is:

1. A magnetic data storage system comprising, a first memory device having a pluarlity of plated-wire elements, a plurality of word straps enveloping one each of said plated-wire elements, a first current source for intermittently supplying word currents to said word straps and a second current source for intermittently supplying bit currents to said plated-wire elements whereby the application of said word current creates a read condition and whereby the simultaneous application of said word current and said bit current provides a write condition, and a second memory device having a plurality of annular cores of ferromagnetic material, a plurality of transformers, one each for each said annular core, each said transformer having a primary winding and a secondary winding with both said windings threading said annular core with which it is associated and wherein said secondary winding is one of said plated-wire elements of said first memory device, and a drive source for intermittently providing current to said primary windings.

References Cited

UNITED STATES PATENTS

| | | | |
|---|---|---|---|
| 3,422,409 | 1/1969 | Bartik | 340—174 |
| 3,000,004 | 9/1961 | Weller | 340—174 |
| 3,031,648 | 4/1962 | Haber | 340—174 |

STANLEY M. URYNOWICZ, Jr., Primary Examiner